United States Patent
Feld

(10) Patent No.: US 11,614,860 B2
(45) Date of Patent: Mar. 28, 2023

(54) SYSTEM AND METHOD FOR VISUALIZING A PRECIOUS GEMSTONE DATABASE

(71) Applicant: Jan Feld LLC, New York, NY (US)

(72) Inventor: John Feld, New York, NY (US)

(73) Assignee: Jan Feld LLC, New York, NY (US)

( * ) Notice: Subject to any disclaimer, the term of this patent is extended or adjusted under 35 U.S.C. 154(b) by 0 days.

(21) Appl. No.: 17/655,947

(22) Filed: Mar. 22, 2022

(65) Prior Publication Data
US 2022/0308743 A1 Sep. 29, 2022

Related U.S. Application Data

(60) Provisional application No. 63/200,702, filed on Mar. 23, 2021.

(51) Int. Cl.
| | | |
|---|---|---|
| *G06F 3/04847* | (2022.01) | |
| *G06Q 30/06* | (2012.01) | |
| *G06Q 30/0601* | (2023.01) | |
| *G06T 11/20* | (2006.01) | |
| *G06F 3/0482* | (2013.01) | |

(52) U.S. Cl.
CPC ........ *G06F 3/04847* (2013.01); *G06F 3/0482* (2013.01); *G06Q 30/0627* (2013.01); *G06T 11/206* (2013.01)

(58) Field of Classification Search
CPC .............. G06F 3/04847; G06F 3/0482; G06Q 30/0627; G06T 11/206
See application file for complete search history.

(56) References Cited

U.S. PATENT DOCUMENTS

| | | | | |
|---|---|---|---|---|
| 2005/0261989 A1* | 11/2005 | Vadon | ................ | G06Q 30/0627 705/27.2 |
| 2007/0005486 A1* | 1/2007 | Haynes | .................. | G06Q 40/04 705/37 |
| 2008/0015870 A1* | 1/2008 | Elowitz | .................. | G06Q 30/06 715/833 |
| 2009/0234754 A1* | 9/2009 | Lapa | .................. | G06Q 30/0278 705/26.1 |
| 2021/0035178 A1* | 2/2021 | Caples | ............... | G06Q 30/0627 |

\* cited by examiner

*Primary Examiner* — Seth A Silverman
(74) *Attorney, Agent, or Firm* — Matthew G. Miller

(57) ABSTRACT

A system and method for visualizing a precious gemstone database is disclosed. The system and method utilizes a streamlined methodology that offers an improved experience for the end-user, as well as an improved sales experience for the merchant selling the precious gemstone(s). The methodology generates a digital visualization of the stock of the precious gemstones that meet parameters selected by the end-user.

19 Claims, 2 Drawing Sheets

SYSTEM AND METHOD FOR VISUALIZING A PRECIOUS GEMSTONE DATABASE

CLAIM OF PRIORITY

This application claims priority to U.S. Provisional Patent Application No. 63/200,702, filed Mar. 23, 2021, entitled "Method of Selecting Precious Gemstones", the contents of which are hereby incorporated by reference in their entirety.

NOTICE OF COPYRIGHTS AND TRADE DRESS

A portion of the disclosure of this patent document contains material which is subject to copyright or trade dress protection. This patent document may show and/or describe matter that is or may become trade dress of the owner. The copyright and trade dress owner has no objection to the facsimile reproduction by anyone of the patent disclosure, as it appears in the Patent and Trademark Office patent files or records, but otherwise reserves all copyright and trade dress rights whatsoever.

FIELD OF THE EMBODIMENTS

The present disclosure relates generally to a system and method for visualizing a database of precious gemstones. More particularly, the present disclosure relates to the visualization of a database of precious gemstones through the utilization of a specific methodology involving simplified inputs and improved visualization of available stones meeting certain parameters.

BACKGROUND

Jewelry makers have been using gemstones to craft jewelry since at least Predynastic Egypt. Gemstones have long been admired for their beauty and rarity. More recently, in the 20th century, precious gemstones (in particular, diamonds) have become popular fixtures on engagement rings.

Precious gemstones are graded using various grading systems. However, most quality grading systems use some combination or variation of the "four C's": color, cut, clarity, and carats. Due to a precious gemstone's rarity and market demand, the cost of a precious gemstone may be high. Further, a precious gemstone's cost will increase with the quality of the stone. Consequently, the consumer is often conflicted between purchasing a high-quality stone and an affordable stone.

Unfortunately, the "four C's" frequently complicate the purchasing process, especially for a purchaser who is unfamiliar with the metrics of the "four C's" or a purchaser who is attached to a strict budget.

While the traditional "four C's" may be suitable for the particular purpose employed, or for general use, they would not be as suitable for the purposes of the present disclosure as disclosed hereafter.

Thus, it would be desirable to have a method of visualizing precious gemstones in a database that aids a purchaser in selecting precious gemstones based on the gemstone grading attributes without overloading the purchaser with unfamiliar information. Such a database visualization method would simplify the process of evaluating a precious gemstone by taking into account a purchaser's desired gemstone attributes, and visualizing such desired attributes in an easy-to-understand format.

In the present disclosure, where a document, act, or item of knowledge is referred to or discussed, this reference or discussion is not an admission that the document, act, item of knowledge, or any combination thereof that was known at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed. It is contemplated that the claims may encompass one or more of the conventional technical aspects discussed herein.

SUMMARY OF THE INVENTION

The present disclosure provides a method for visualizing a precious gemstone database, including a step of providing a multidimensional computerized database containing a plurality of data objects, preferably where each data object corresponds to one precious gemstone available for purchase within an inventory of precious gemstones, and more preferably where each data object contains a plurality of dimensions, each dimension representing a property of the corresponding precious gemstone. In an embodiment, the method includes a step of displaying a graphical user interface (GUI) window on an electronic computing device. In an embodiment, the method includes a step of querying a user, via the GUI, about the user's size preference for a desired precious gemstone. In an embodiment, the method includes a step of entering by the user, via the GUI, the user's size preference. In an embodiment, the method includes a step of querying the user, via the GUI, about the user's cost preference for the desired precious gemstone. In an embodiment, the method includes a step of entering by the user, via the GUI, the user's cost preference. In an embodiment, the method includes a step of querying the user, via the GUI, about the user's preference of type of precious gemstone for the desired precious gemstone. In an embodiment, the method includes a step of entering by the user, via the GUI, the user's type of precious gemstone preference. In an embodiment, the method includes a step of querying the user, via the GUI, about the user's shape preference for the desired precious gemstone. In an embodiment, the method includes a step of entering by the user, via the GUI, the user's shape preference. In an embodiment, the method includes a step of preparing an intermediate list by searching the computerized database for all data objects that meet the preferences entered by the user. In an embodiment, the method includes a step of displaying a data visualization area in the GUI to the user. In an embodiment, the method includes a step of generating a grid in the data visualization area, preferably where the grid has a first segmented axis corresponding to price and a second segmented axis corresponding to size, each box of the grid representing a range of prices and sizes corresponding to its location on each of the first and second segmented axes. In an embodiment, the method includes a step of populating each box of the grid with a plurality of segmented scales, preferably generated such that each segmented scale within the plurality of segmented scales corresponds to one of the plurality of dimensions on a one-to-one basis, more preferably where each segmented scale within the plurality of segmented scales is populated, either partially or completely, with data objects from the intermediate list, according to a value of a corresponding dimension of each data object.

In an embodiment, the plurality of dimensions include the precious gemstone properties of size, type, shape, cost, cut, clarity, and color.

In an embodiment, the method includes a step of identifying the data object in the intermediate list with the smallest size property. In an embodiment, the method includes a step of removing all data objects in the intermediate list with a size property greater than a predetermined amount based on the smallest size property. In an exemplary embodiment, the predetermined amount is 2.5 times the smallest size property.

In some embodiments, any of the querying steps may include generating for display, via the GUI, to the user a range of sizes with one or more interactive adjustable sliders.

In some embodiments, any of the querying steps may include generating for display, via the GUI, to the user a number of interactive selection choices. In an exemplary embodiment, one interactive selection choice is generated for each available gemstone type.

In some embodiments, the available gemstone types include diamonds, rubies, sapphires, and emeralds. In some embodiments, the available gemstone types include naturally formed and artificially formed gemstones. In some embodiments, the available gemstone types are generated based on the properties of the precious gemstones currently within the inventory.

In an embodiment, the first segmented axis is segmented into three subranges of substantially equal size. In an embodiment, the second segmented axis is segmented into three subranges of substantially equal size. In an exemplary embodiment, both the first and the second segmented axes are segmented into three subranges of substantially equal size so as to form a 3×3 grid.

In an embodiment, each scale of the plurality of scales is displayed to the user such that the data objects populated within are sorted in ascending order. In an embodiment, the scale from the plurality of scales corresponding to color is segmented into 5 or more parts, each segment representing a precious gemstone color grade. In an embodiment, the scale from the plurality of scales corresponding to clarity is segmented into 6 or more parts, each segment representing a precious gemstone clarity grade. In an embodiment, the scale of from the plurality of scales corresponding to cut is segmented into 3 or more parts, each segment representing a precious gemstone cut grade.

In an embodiment, each box of the grid generated by the method is selectable by the user, and upon selection by the user, the GUI generates a visualization of a subset of precious gemstones corresponding to each data object within the selected box of the grid. In an embodiment, each segmented scale of the plurality of segmented scales generated by the method is selectable by the user, and upon selection by the user, the GUI generates a visualization of a subset of precious gemstones corresponding to each data object within the selected segmented scale of the plurality of segmented scales. In an embodiment, each segment within each segmented scale generated by the method is selectable by the user, and upon selection by the user, the GUI generates a visualization of a subset of precious gemstones corresponding to each data object within the selected segment.

In an embodiment, the visualization of the subset of precious gemstones includes individually labeled visualizations corresponding to one or more of: a largest gemstone within the subset, a least expensive gemstone within the subset, a highest quality gemstone within the subset, or a gemstone having the highest ratio of cost to quality within the subset.

The present disclosure also provides for a computing system including a processor. In an embodiment, the computing system includes a memory. In an embodiment, the computing system includes a multidimensional computerized database containing a plurality of data objects, preferably where each data object corresponds to one precious gemstone available for purchase within an inventory, and more preferably where each data object contains a plurality of dimensions, each dimension representing a property of the corresponding precious gemstone within an inventory. In an embodiment, the computing system includes a program, stored within the memory and configured to be executed by the processor, preferably where the program includes instructions which, once executed by the processor, cause the computing system to display a graphical user interface (GUI) window on an electronic computing device that includes queries. In some embodiments, the program includes instructions which, once executed by the processor, cause the computing system to query a user, via the GUI, about the user's minimum size preference for a desired precious gemstone. In some embodiments, the program includes instructions which, once executed by the processor, cause the computing system to enter, via the GUI, the user's minimum size preference. In some embodiments, the program includes instructions which, once executed by the processor, cause the computing system to query the user, via the GUI, about the user's minimum cost preference for the desired precious gemstone. In some embodiments, the program includes instructions which, once executed by the processor, cause the computing system to enter, via the GUI, the user's minimum cost preference. In some embodiments, the program includes instructions which, once executed by the processor, cause the computing system to query the user, via the GUI, about the user's preference of type of precious gemstone for the desired precious gemstone. In some embodiments, the program includes instructions which, once executed by the processor, cause the computing system to enter, via the GUI, the user's type of precious gemstone preference. In some embodiments, the program includes instructions which, once executed by the processor, cause the computing system to query the user, via the GUI, about the user's shape preference for the desired precious gemstone. In some embodiments, the program includes instructions which, once executed by the processor, cause the computing system to enter, via the GUI, the user's shape preference. In some embodiments, the program includes instructions which, once executed by the processor, cause the computing system to prepare an intermediate list by searching the computerized database for all data objects that meet the user's preferences entered for minimum size, minimum cost, shape, and type of precious gemstone. In some embodiments, the program includes instructions which, once executed by the processor, cause the computing system to display a data visualization area in the GUI to the user. In some embodiments, the program includes instructions which, once executed by the processor, cause the computing system to generate a grid in the data visualization area, preferably where the grid has a first segmented axis corresponding to price and a second segmented axis corresponding to size, more preferably where each box of the grid represents a range of prices and sizes corresponding to its location on each of the first and second segmented axes. In some embodiments, the program includes instructions which, once executed by the processor, cause the computing system to populate each box of the grid with a plurality of segmented scales, preferably generated such that each segmented scale within the plurality of segmented scales corresponds to one of the plurality of dimensions, more preferably generated such that each segmented scale within the plurality of segmented scales is populated, either partially or completely, with data objects from the intermediate list, according to a value of a corresponding dimension of each data object as it pertains to the inventory.

The claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

Implementations may include one or a combination of any two or more of the aforementioned features or embodiments.

These and other aspects, features, implementations, and advantages can be expressed as methods, apparatuses, systems, components, program products, business methods, and means or steps for performing functions, or some combination thereof.

Other features, aspects, implementations, and advantages will become apparent from the descriptions, the drawings, and the claims.

BRIEF DESCRIPTION OF THE PREFERRED EMBODIMENTS

In the drawings, like elements are depicted by like reference numerals. The drawings are briefly described as follows.

Figure 1:
FIG. 1 shows a flow chart illustrating an embodiment of the method in accordance with the present disclosure.
Figure 2:
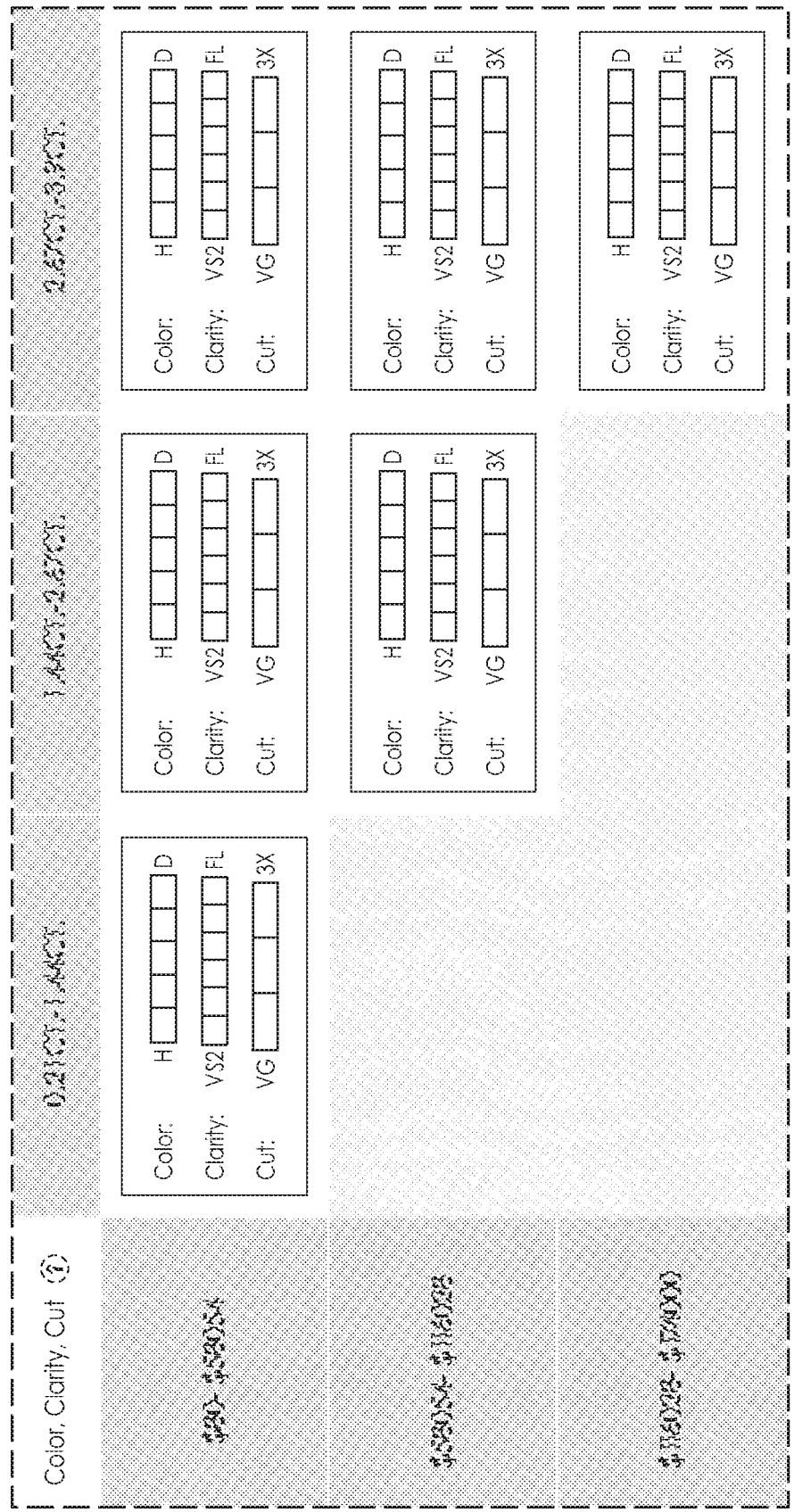
FIG. 2 shows a representation of a data visualization grid in accordance with the present disclosure.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete, and fully conveys the scope of the present disclosure to those skilled in the art. In fact, it will be apparent to those skilled in the art that various modifications and variations can be made in the present invention without departing from the scope or spirit of the invention.

DETAILED DESCRIPTION OF THE PREFERRED EMBODIMENTS

Reference will now be made in detail to each embodiment of the present invention. Such embodiments are provided by way of explanation of the present invention, which is not intended to be limited thereto in any manner whatsoever. In fact, those of ordinary skill in the art may appreciate upon reading the present specification and viewing the present drawings that various modifications and variations can be made thereto.

For purposes of the present disclosure of the invention, unless specifically disclaimed, the singular includes the plural and vice-versa, the words "and" and "or" shall be both conjunctive and disjunctive, the words "any" and "all" shall both mean "any and all".

Various embodiments of the method in accordance with the present disclosure are contemplated. In one embodiment, the method of selecting a precious gemstone from a cache of precious gemstones begins with the user first sharing their ideal size and budget for the precious gemstone. While highly preferred embodiments of the method in accordance with the present disclosure have diamonds as the precious gemstone, rubies, emeralds, sapphires, and other precious gemstones can also be selected using the methodology in accordance with the present disclosure. your ideal diamond size and budget.

From there, industry data surrounding precious gemstones is aggregated to show the user available color, clarity, and cut grades within the size and price ranges earlier set by the user. The color clarity and cut, collectively, comprise a precious gemstones overall quality. By showing the user visualizations of the varying quality options available based on the user's size and budget ranges, the user is able to select a gemstone for future use with confidence and without undue searching through extensive gemological database.

Once the user has selected the precious gemstone they desire, some embodiments of the method continue to provide the user with a picture, a 360-degree video, and a gemological grading report of the selected precious gemstone. The user will then have a period of time, preferably 24 hours, to either accept or reject the selected precious gemstone.

By streamlining the precious gemstone selection process, a far better experience is achieved. Existing methods require that the end-user enter all desired parameters at the onset of the selection process. This can include the precious gemstone's price, size, color, clarity, and cut, which is then used to provide the user with an overwhelming amount of information, providing little-to-no guidance to the end user. For the average end-user who has limited knowledge of precious gemstones and what is important, these existing methods are inadequate.

However, by limiting the initial inputs to the two most approachable and commonly understood characteristics of a precious gemstone, the cost and size, an end-user who is not familiar with precious gemstones, and meaningfully participate in the selection process, and helps avoid overwhelming the user with too much unfiltered information at once. Further, by limiting the number of precious gemstones presented to the user at once, by capping the upper size range to 2.5× the lower size range, an improved process is achieved. Preferably, the cost of the precious gemstones that meet the user's size and cost parameters will not be capped, although embodiments exist where a maximum cost is used to limit the amount of precious gemstones visualized for and eventually presented to the user. This capping limits the user from creating overly broad searches, which means the results will be more concise and usable, and by limiting the highest cost, it removes the appearance that diamond prices have no upward limit, which functionally makes setting an upper price more difficult. Removing user's need to input quality ranges helps reduce the likelihood of an unproductive or overly broad search.

The method in accordance with the present disclosure also assists with contextualizing the quality of the precious gemstones for the user. By presented visualized aggregate data, as opposed to listings of individual stones, users are more readily able to determine if their search parameters are worthwhile. This is especially true when a search returns thousands of potential matches. Moreover, this visualization allows a user to quickly understand exactly what their budget can yield, all without the user worrying about overlooking a quality option. The 3×3 grid in accordance with the present disclosure greatly aids in this process, by breaking up results into thirds such that even more granular context is provided. An example of this granular context is whether the lower third of the user's budget and the middle third of the user's budget can yield the same quality stone at the same size. In some embodiments, the list of precious gemstones that is visualized is expanded slightly beyond the user's selected size and cost parameters.

One important feature of some embodiments of the method in accordance with the present disclosure, is that instead of a user being presented with an individual stone or stones, the ultimately provided diamond is guaranteed to be within the parameters of the space of the digital grid selected by the user.

In a highly preferred embodiment, the 3×3 data visualization grid has two axes one for price and one for size. Preferably, each of these axes is divided into three substantially equal ranges, creating a 3×3 grid of 9 spaces, each pertaining to the relevant range on the appropriate axis. Within these spaces, three scales are provided: a color scale, a clarity scale, and a cut scale. Preferably the color scale has 5 parts, each part corresponding to one color. However, other color scales exist, and will largely depend on the type of precious gemstone being selected. For example, when the precious gemstone is diamond, the color scale will range from H→D.

In some embodiments, the cut grade scale has three parts, which preferably pertain to "triple excellent", "excellent", and "very good". In other embodiments, the clarity scale has 6 parts, which preferably pertain to VS2→FL. When populating this data visualization grid, a part on the scale will be filled in when one or more data objects have one of its plurality of properties that satisfies the value associated with that part, within the range dictated by the square of the data visualization grid. In an exemplary embodiment, the precious gemstone grades used within each scale represent those standardized by the Gemological Institute of America. In other embodiments, the precious gemstone grades used within each scale may represent those promulgated by other standardization bodies within the field.

Those of ordinary skill in the art may appreciate upon reading the present specification and viewing the present drawings that various modifications and variations can be made thereto.

When introducing elements of the present disclosure or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

While the disclosure refers to exemplary embodiments, it will be understood by those skilled in the art that various changes may be made and equivalents may be substituted for elements thereof without departing from the scope of the disclosure. In addition, many modifications will be appreciated by those skilled in the art to adapt a particular instrument, situation or material to the teachings of the disclosure without departing from the spirit thereof. Therefore, it is intended that the disclosure not be limited to the particular embodiments disclosed.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," and "third," are used herein to describe various elements, components, regions, layers and/or sections, these elements, components, regions, layers and/or sections should not be limited by these terms. These terms are only used to distinguish one element, component, region, layer and/or section from another element, component, region, layer and/or section. Thus, a "first element," "component," "region," "layer" and/or "section" discussed below could be termed a second element, component, region, layer and/or section without departing from the teachings herein.

Features illustrated or described as part of one embodiment can be used with another embodiment and such variations come within the scope of the appended claims and their equivalents. Implementations may also include one or a combination of any two or more of the aforementioned features or embodiments.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

The disclosure is illustrated throughout the written description. It should be understood that numerous variations are possible while adhering to the inventive concept. Such variations are contemplated as being a part of the present disclosure.

What is claimed is:

1. A method for visualizing a precious gemstone database, comprising the steps of:
   (a) providing a multidimensional computerized database containing a plurality of data objects, wherein each data object corresponds to one precious gemstone available for purchase within an inventory of precious gemstones, and wherein each data object contains a plurality of dimensions, each dimension representing a property of the corresponding precious gemstone;
   (b) displaying a graphical user interface (GUI) window on an electronic computing device;
   (c) querying a user, via the GUI, about the user's size preference for a desired precious gemstone;
   (d) entering by the user, via the GUI, the user's size preference;
   (e) querying the user, via the GUI, about the user's cost preference for the desired precious gemstone;
   (f) entering by the user, via the GUI, the user's cost preference;
   (g) querying the user, via the GUI, about the user's preference of type of precious gemstone for the desired precious gemstone;
   (h) entering by the user, via the GUI, the user's type of precious gemstone preference;
   (i) querying the user, via the GUI, about the user's shape preference for the desired precious gemstone;
   (j) entering by the user, via the GUI, the user's shape preference;
   (k) preparing an intermediate list by searching the computerized database for all data objects that meet the preferences entered in steps (d), (f), (h), and (j);
   (l) displaying a data visualization area in the GUI to the user;
   (m) generating a grid in the data visualization area, wherein the grid has a first segmented axis corresponding to price and a second segmented axis corresponding to size, each box of the grid representing a range of prices and sizes corresponding to its location on each of the first and second segmented axes; and
   (n) populating each box of the grid with a plurality of segmented scales, generated such that each segmented scale within the plurality of segmented scales corresponds to one of the plurality of dimensions on a one-to-one basis, each segmented scale within the plurality of segmented scales populated, either partially or completely, with data objects from the intermediate list, according to a value of a corresponding dimension of each data object.

2. The method of claim 1, wherein the plurality of dimensions include the precious gemstone properties of size, type, shape, cost, cut, clarity, and color.

3. The method of claim 2, wherein the scale from the plurality of scales corresponding to color is segmented into 5 or more parts, each segment representing a precious gemstone color grade.

4. The method of claim 2, wherein the scale from the plurality of scales corresponding to clarity is segmented into 6 or more parts, each segment representing a precious gemstone clarity grade.

5. The method of claim 2, wherein the scale of from the plurality of scales corresponding to cut is segmented into 3 or more parts, each segment representing a precious gemstone cut grade.

6. The method of claim 1, further comprising the steps of: identifying the data object in the intermediate list with the smallest size property, and removing all data objects in the intermediate list with a size property greater than a predetermined amount based on the smallest size property.

7. The method of claim 6, wherein the predetermined amount is 2.5 times the smallest size property.

8. The method of claim 1, wherein step (c) comprises generating for display, via the GUI, to the user a range of sizes with one or more interactive adjustable sliders.

9. The method of claim 1, wherein step (e) comprises generating for display, via the GUI, to the user a range of costs with one or more interactive adjustable sliders.

10. The method of claim 1, wherein step (g) comprises generating for display, via the GUI, to the user a number of interactive selection choices, one interactive selection choice being generated for each available gemstone type.

11. The method of claim 10, wherein the available gemstone types include diamonds, rubies, sapphires, and emeralds.

12. The method of claim 10, wherein the available gemstone types include naturally formed and artificially formed gemstones.

13. The method of claim 10, wherein the available gemstone types are generated based on the properties of the precious gemstones currently within the inventory.

14. The method of claim 1, wherein the first segmented axis is segmented into three subranges of substantially equal size.

15. The method of claim 1, wherein the second segmented axis is segmented into three subranges of substantially equal size.

16. The method of claim 1, wherein each scale of the plurality of scales is displayed to the user such that the data objects populated within are sorted in ascending order.

17. The method of claim 1, wherein each box of the grid generated in step (m), each segmented scale of the plurality of segmented scales generated in step (n), and each segment within each segmented scale is selectable by the user, and upon selection by the user, the GUI generates a visualization of a subset of precious gemstones corresponding to each data object within the selected box of the grid, segmented scale, or segment.

18. The method of claim 17, wherein the visualization of the subset of precious gemstones further comprises individually labeled visualizations corresponding to one or more of: a largest gemstone within the subset, a least expensive gemstone within the subset, a highest quality gemstone within the subset, or a gemstone having the highest ratio of cost to quality within the subset.

19. A computing system, comprising:
a processor;
a memory;
a multidimensional computerized database containing a plurality of data objects, wherein each data object corresponds to one precious gemstone available for purchase within an inventory, and wherein each data object contains a plurality of dimensions, each dimension representing a property of the corresponding precious gemstone within an inventory; and
a program, stored within the memory and configured to be executed by the processor, the program comprising instructions which, once executed by the processor, cause the computing system to:
  display a graphical user interface (GUI) window on an electronic computing device that includes queries;
  query a user, via the GUI, about the user's minimum size preference for a desired precious gemstone;
  enter, via the GUI, the user's minimum size preference;
  query the user, via the GUI, about the user's minimum cost preference for the desired precious gemstone;
  enter, via the GUI, the user's minimum cost preference;
  query the user, via the GUI, about the user's preference of type of precious gemstone for the desired precious gemstone;
  enter, via the GUI, the user's type of precious gemstone preference;
  query the user, via the GUI, about the user's shape preference for the desired precious gemstone;
  enter, via the GUI, the user's shape preference;
  prepare an intermediate list by searching the computerized database for all data objects that meet the user's preferences entered for minimum size, minimum cost, shape, and type of precious gemstone;
  display a data visualization area in the GUI to the user;
  generate a grid in the data visualization area, wherein the grid has a first segmented axis corresponding to price and a second segmented axis corresponding to size, each box of the grid representing a range of prices and sizes corresponding to its location on each of the first and second segmented axes; and
  populate each box of the grid with a plurality of segmented scales, generated such that each segmented scale within the plurality of segmented scales corresponds to one of the plurality of dimensions, each segmented scale within the plurality of segmented scales populated, either partially or completely, with data objects from the intermediate list, according to a value of a corresponding dimension of each data object as it pertains to the inventory.

* * * * *